(12) United States Patent
Martinez et al.

(10) Patent No.: US 7,054,333 B2
(45) Date of Patent: May 30, 2006

(54) METHODS AND APPARATUS FOR DISTRIBUTED SCCP MANAGEMENT PROCEDURES

(75) Inventors: Antonio Canete Martinez, Madrid (ES); Florencio Escobar González, Madrid (ES); Vicente de Vega de la Red, Madrid (ES); Daniel Valencia Alvarez, Cuenca (ES); Mónica Sanz de la Viuda, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 911 days.

(21) Appl. No.: 09/918,331

(22) Filed: Jul. 30, 2001

(65) Prior Publication Data
US 2004/0015937 A1 Jan. 22, 2004

Related U.S. Application Data

(60) Provisional application No. 60/285,072, filed on Apr. 19, 2001.

(51) Int. Cl.
*H04J 3/16* (2006.01)

(52) U.S. Cl. ...................................... 370/469; 370/352
(58) Field of Classification Search ................ 370/352, 370/353, 354, 355, 356, 410, 465, 466, 467, 370/469
See application file for complete search history.

(56) References Cited

U.S. PATENT DOCUMENTS

| | | | |
|---|---|---|---|
| 5,268,895 A | 12/1993 | Topper | |
| 5,638,371 A * | 6/1997 | Raychaudhuri et al. .. | 370/310.2 |
| 5,905,715 A | 5/1999 | Azarmi et al. | |
| 6,038,218 A | 3/2000 | Otsuka et al. | |
| 6,195,425 B1 | 2/2001 | Farris | |
| 6,260,186 B1 * | 7/2001 | James ........................ | 717/104 |
| 6,377,674 B1 * | 4/2002 | Chong et al. ............... | 379/230 |
| 6,496,694 B1 * | 12/2002 | Menon et al. ........... | 455/426.2 |
| 6,678,369 B1 * | 1/2004 | DeMent et al. ........ | 379/221.03 |
| 6,731,741 B1 * | 5/2004 | Fourcand et al. ...... | 379/221.08 |
| 2002/0136233 A1 * | 9/2002 | Chen et al. ................. | 370/445 |

FOREIGN PATENT DOCUMENTS

| | | | |
|---|---|---|---|
| EP | 1 026 867 A2 | 8/2000 | |
| EP | 1 089 575 A2 | 4/2001 | |

OTHER PUBLICATIONS

International Telecommunication Union Recommendations Q.711; Series Q: Switching and Signalling: Specifications of Signalling System No. 7—Signalling Connection Control Part (SCCP), Functional Description of the Signalling Connection Control Part, pp. 1-37, Mar. 2001.

International Telecommunication Union Recommendations Q.712; Series Q: Switching and Signalling; Specifications of Signalling System No. 7—Signalling Connection Control Part (SCCP), Definition and Function of Signalling Connection Control Part Messages, pp. 1-60, Jul. 1996.

(Continued)

*Primary Examiner*—Ricky Ngo
*Assistant Examiner*—Christine Ng

(57) ABSTRACT

Network signalling apparatus and methods use at least an SCCP protocol layer of Signalling System number 7 (SS7) and other protocol layers. The SCCP protocol layer supports connectionless and connection-oriented protocol services, and network management procedures are carried out on a per protocol service basis, that is, network management procedures at SCCP are independently treated for connectionless and for connection-oriented protocol services.

53 Claims, 8 Drawing Sheets

OTHER PUBLICATIONS

International Telecommunication Union Recommendations Q.713; Series Q: Switching and Signalling; Specifications of Signalling System No. 7—Signalling Connection Control Part (SCCP), Signalling Connection Control Part Formats and Codes, pp. 1-60, Mar. 2001.

International Telecommunication Union Recommendations Q.714; Series Q: Switching and Signalling; Specifications of Signalling System No. 7—Signalling Connection Control Part (SCCP), Signalling Connection Control Part Procedures, pp. 1-79, May 2001.

* cited by examiner

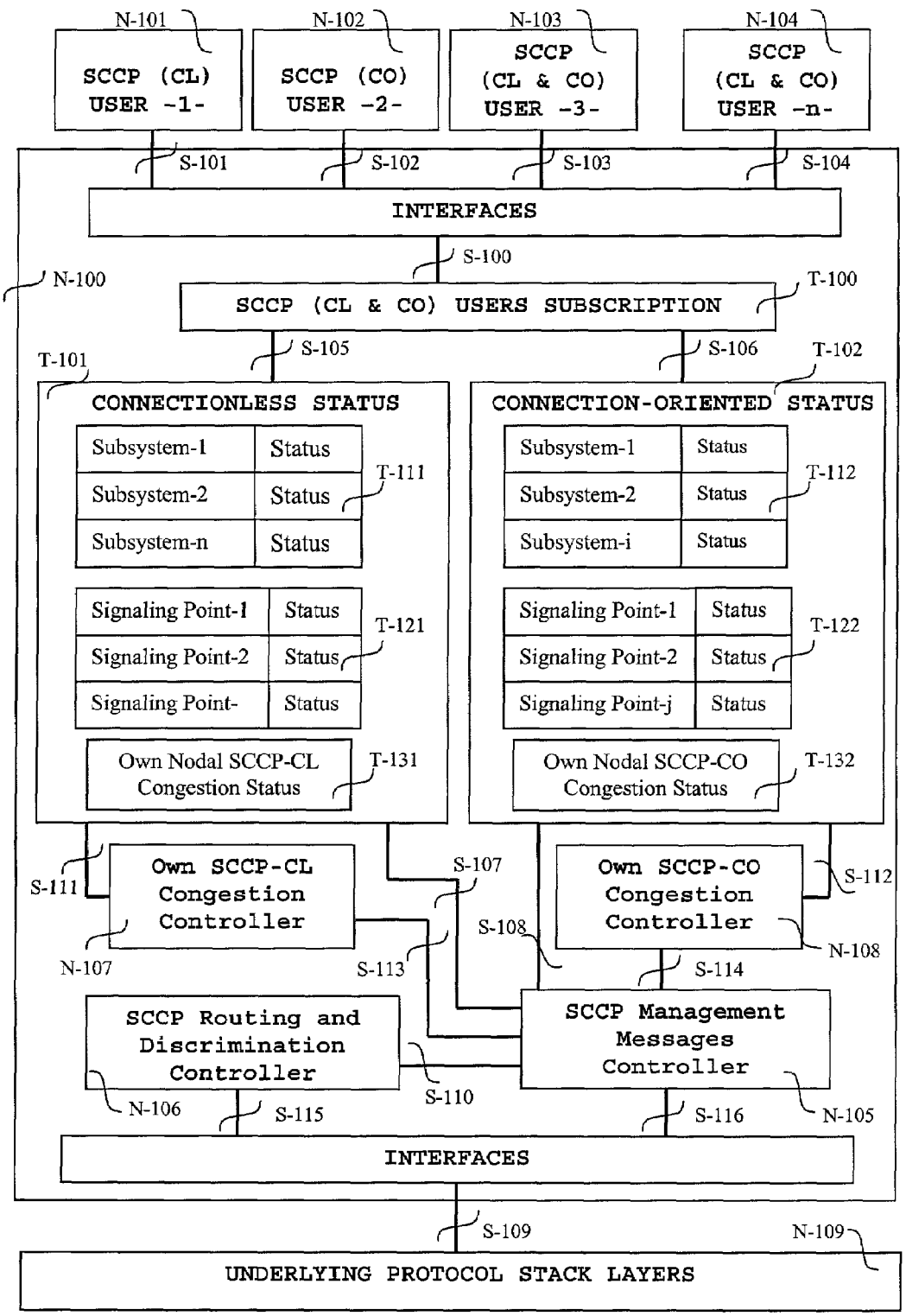
FIG.-1-

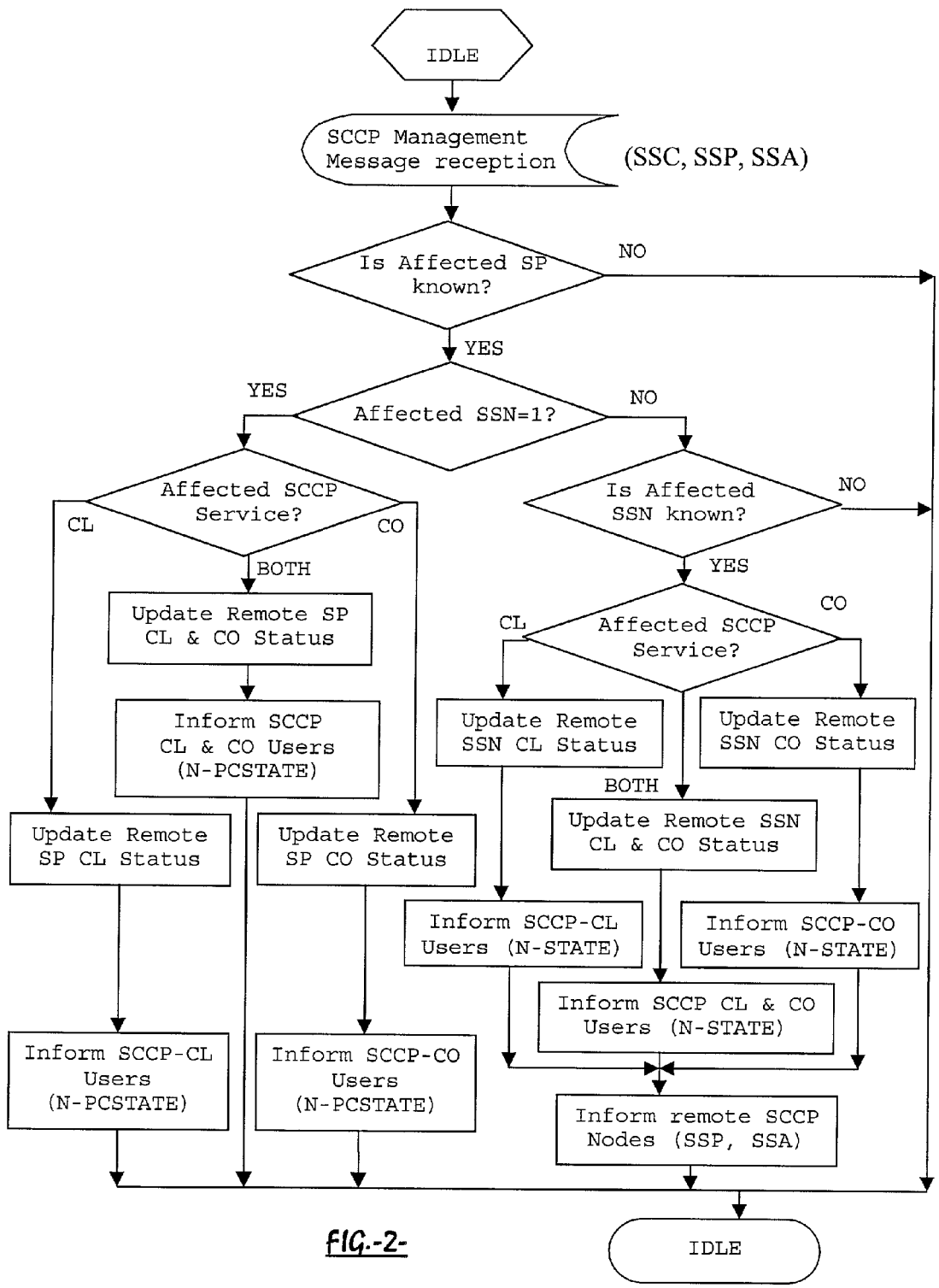
FIG.-2-

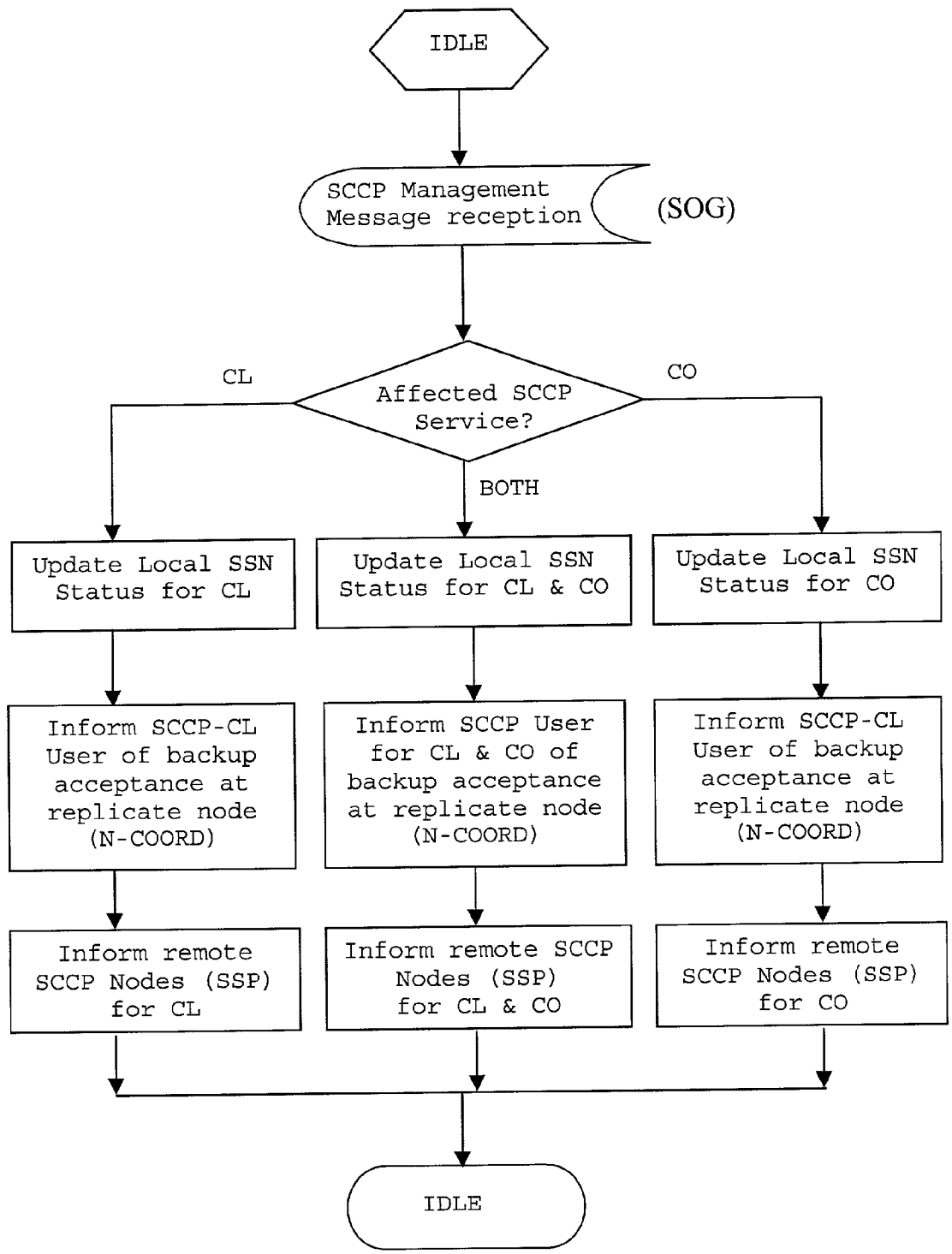
FIG.-3-

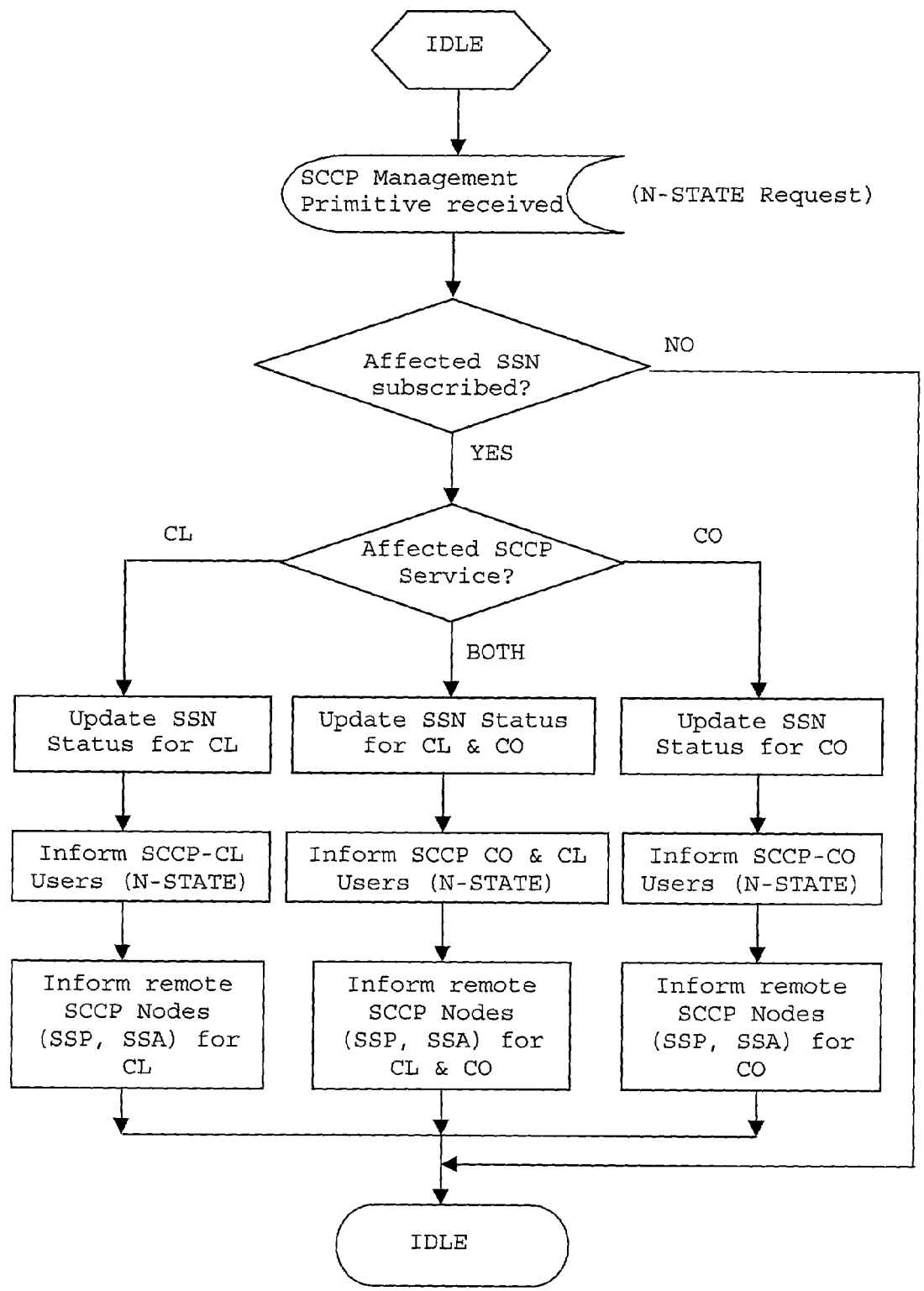
FIG.-4-

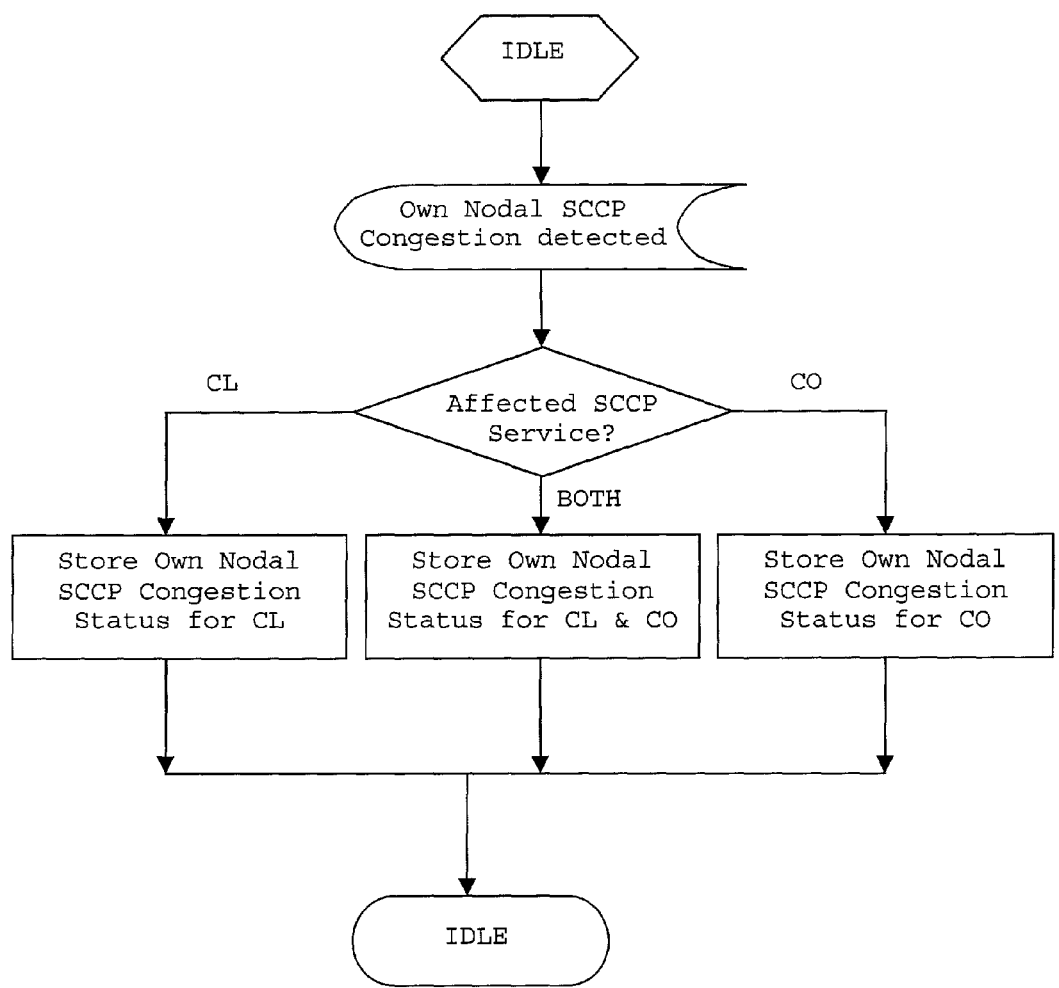
FIG.-5-

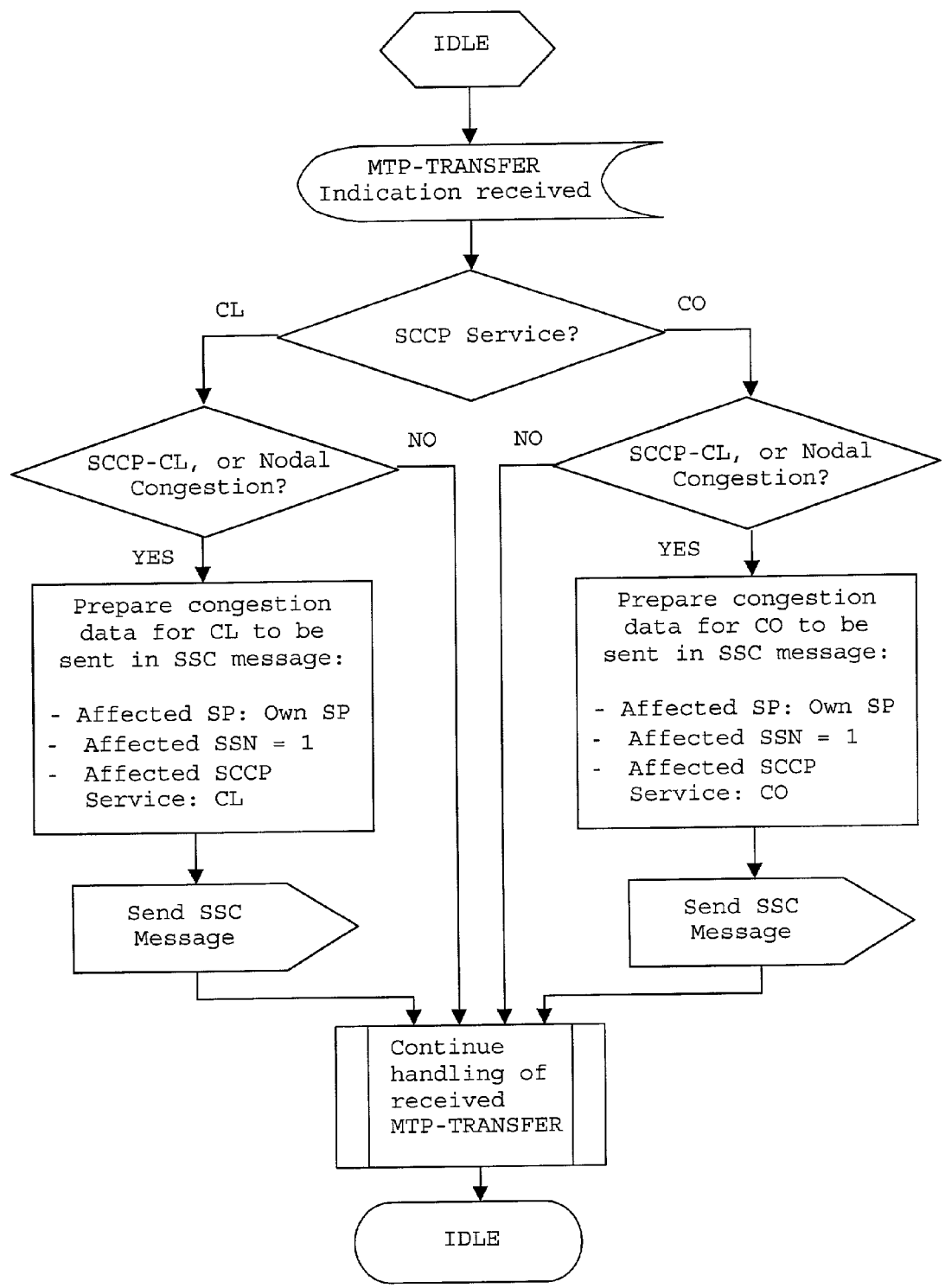
FIG.-6-

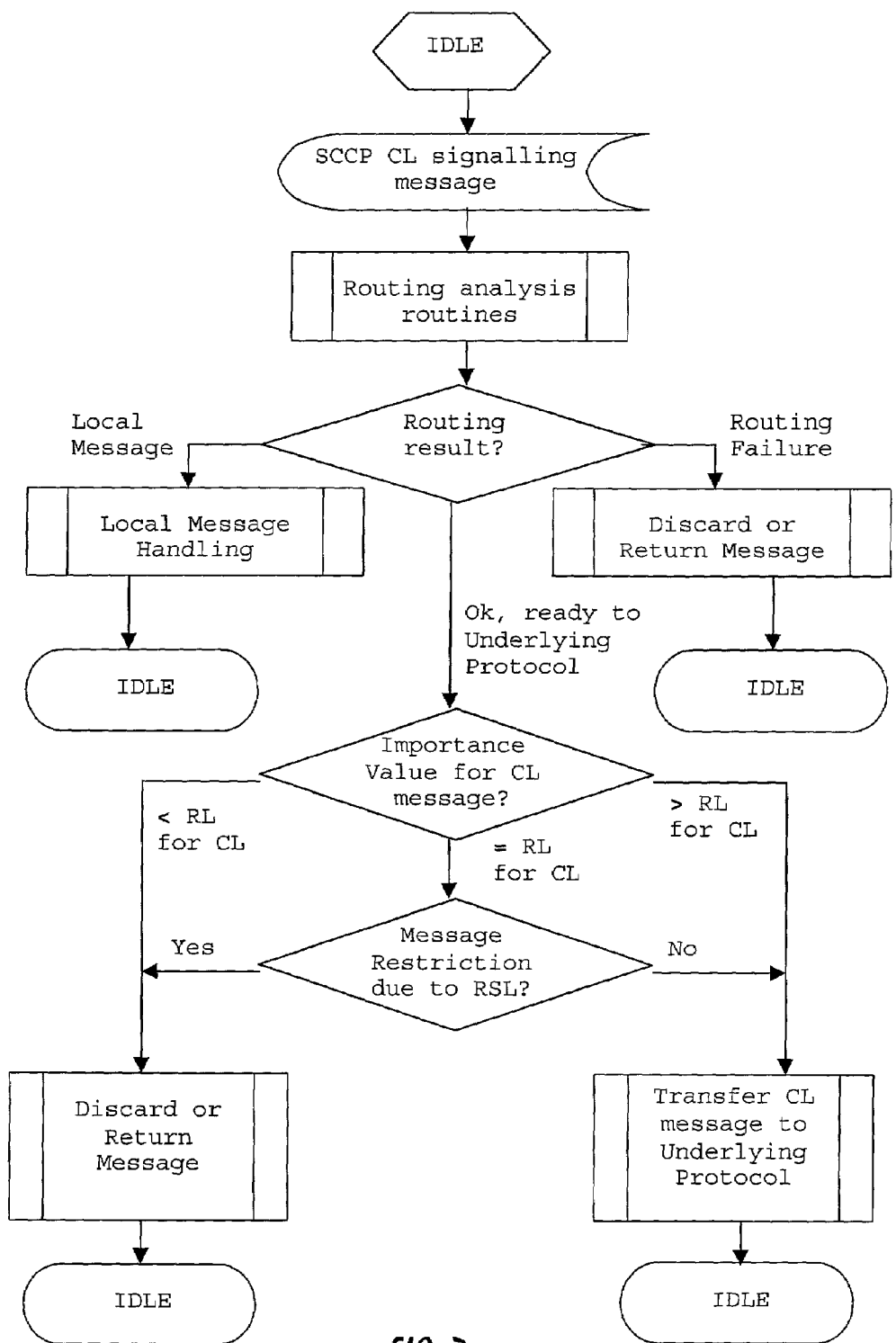
FIG.-7-

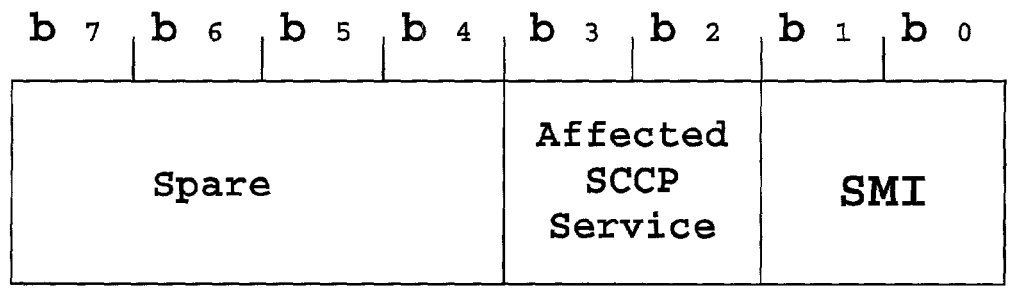
FIG.-8(a)-
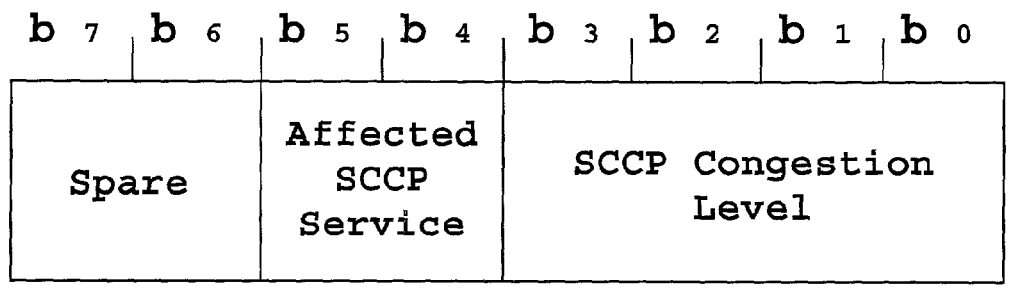
FIG.-8(b)-

METHODS AND APPARATUS FOR DISTRIBUTED SCCP MANAGEMENT PROCEDURES

This application claims priority under 35 U.S.C. § 119(e) to 60/285,072 filed in The United States of America on Apr. 19, 2001; the entire content of which is hereby incorporated by reference.

BACKGROUND

The present invention relates generally to Common Channel Signalling Networks, and more specifically to the Signalling Connection Control Part Management Procedures.

According to the Telecommunication Standardization Sector of the International Telecommunication Union ("ITU-T") Recommendations Q.711–Q714 for Signalling System Number 7 ("SS7"), the Signalling Connection Control Part ("SCCP") is situated between the User Part or Application levels and the Message Transfer Part ("MTP") levels. In this respect, a Signalling Network purely based on SS7 comprises a plurality of SS7 Nodes, generically known as Signalling Points ("SP"), that are interconnected by Signalling Links. Moreover, SS7 nodes are internally structured as a protocol stack having different levels.

Generally speaking, the MTP is in charge of the Physical level (MTP level 1), the Datalink level (MTP level 2), and the Network level (MTP level 3), in accordance to the lowest layers in the Open System Interconnection (OSI) model.

More specifically, the physical level deals with the electrical characteristics to transmit and receive SS7 message data through the links. The datalink level provides error detection and correction, as well as the means to manage, buffer, and control data transmission, and eventual retransmission, in the appropriate sequence through the links. The network level is responsible for SS7 message Routing, SS7 message Discrimination, and SS7 message Delivery functions, in which an SS7 message is generally referred to as a Message Signal Unit ("MSU").

Nowadays, the rapidly growth of Internet applications and the needs for interconnecting the previous generation based systems with newer ones force to consider different protocol mixtures in combined stacks. In this respect, working groups like SIGTRAN under the Internet Engineering Task Force ("IETF") are issuing different recommendations to enable transport mechanisms to transfer SS7 signalling throughout the Internet network. These transport mechanisms, described by different SIGTRAN recommendations, make use of different combinations of protocols arranged in different stacks, depending on the SS7 layer having messages to be transported. For example, some mechanisms and architectures have been introduced to encapsulate or to adapt the SCCP signalling to underlying protocol stack layers other than MTP, like the Stream Control Transmission Protocol ("SCTP"), or the Transmission Control Protocol ("TCP"), further encapsulated or adapted over the Internet Protocol ("IP").

The SCCP, generally speaking, is in charge of functions partially comprised by the Network level and functions partially comprised by the Transport level. In other words, the SCCP provides additional functionality to the MTP Network level functions, or to other Transport level functions like the aforementioned SCTP or TCP. Moreover, SCCP supports both Connectionless and Connection-Oriented network services between SCCP Users located in SS7 Signalling Nodes, namely Signalling Points. For the purposes of this description, an SS7 Signalling Node is a network node in which at least the SS7 SCCP layer is supported. Furthermore, an SCCP of reference also comprises the SCCP network Management function that is in charge of maintaining the status of the remote signalling points, the remote SCCP layers, and the remote SCCP applications with which the SCCP of reference has a signalling relationship.

Still further, the SCCP network Management also informs its local users (also called "SCCP applications") about changes in the states of remote signalling points and remote subsystems, namely SCCP applications, that the SCCP network Management monitors. In a similar way, the SCCP applications may inform the local SCCP about their availability for receiving traffic for the latter to appropriately inform the remote signalling points with which there is a signalling relationship.

In accordance with ITU-T recommendations Q.711–Q.714, the SCCP network Management makes use of certain standard messages and primitives. All these SCCP management messages and primitives consider the SCCP as a whole network entity layer, without distinguishing between SCCP connectionless and SCCP connection-oriented services. Also in accordance with the aforementioned recommendations, an SS7 signalling message is an information unit exchanged between SS7 nodes, whereas SS7 primitives are information units exchanged between different layers of a protocol stack in an SS7 node. In this respect, assuming that different layers might be supported by protocols other than SS7, and as already mentioned for the purposes of this description, an SS7 Signalling Node is a network node in which at least an SS7 SCCP layer is supported.

For example, the SS7 Management message Subsystem Status Allowed ("SSA") message indicates to the receiver SCCP that the affected Subsystem Number representing an SCCP application ("SSN") in a remote SP becomes available for signalling traffic purposes. Another example of an SS7 Management message is the Subsystem Status Prohibited ("SSP") message that indicates to the receiver SCCP that the affected SSN in a remote SP becomes unavailable for signalling traffic purposes.

Still another example of an SS7 Management message is the SCCP/Subsystem Congestion ("SSC") message that indicates to the receiver SCCP that the SCCP in the given remote SP has reached the indicated congestion level for signalling traffic purposes. In this respect and more specifically, an SSN=1 message represents the SCCP itself and indicates that this remote SCCP reaches the indicated availability status or congestion level.

These SS7 Management messages at the receiver SCCP node are mapped into the corresponding primitive to indicate the local SCCP users the availability status of remote applications or nodes for receiving and sending signalling traffic. For example, the SS7 Management messages above are mapped into the primitive N-STATE_indication with the appropriate parameter values. In addition, there are primitives from local SCCP users wanting remote SCCP applications or nodes to take SS7 Management related actions, like N-COORD_request for example. Still another example of primitives from local SCCP users (identified by an SSN value) is the N-STATE_request. At reception of this primitive at the SCCP indicating "User_Out_Of_Service", the SCCP generates an SSP Management message with the originating SCCP user SSN value as the "Affected SSN", and the own Signalling Point code as the "Affected SP". Similarly, at reception of this primitive at the SCCP indicating "User_In_Service", the SCCP generates an SSA Management message with the originating SCCP user SSN value as the "Affected SSN", and the own Signalling Point code as the "Affected SP".

The huge market growth of mobile subscriptions makes the control and performance of mobile networks a great challenge. The mobile networks, especially, have to be carefully dimensioned to squeeze the most out of their possibilities. Quite a few mechanisms have been introduced to optimize network performance, and since most mobile networks use SS7 SCCP, the already standardized Congestion Control functionality is one of them. The Congestion Control is found to be quite significant to prioritize the most urgent signalling messages depending on the congestion level that certain SS7 nodes reach.

More specifically, quite sophisticated mechanisms can be described to assess the local nodal congestion level or local SCCP user congestion level, which are supposed to be implementation dependent by ITU-T recommendations Q.711–Q.714. However, the standard recommendations define how to indicate the congestion level to remote signalling points with which a signalling relationship at SCCP layer exist by SSC signalling messages. Moreover, an SCCP layer at an SS7 signalling node receiving such an SSC with an indicated congestion level should be able to stop signalling traffic toward the indicated affected node for all signalling messages with lower priority than the indicated for the congestion level. The aim is to reduce traffic load based on different message priorities and depending on the particular congestion level.

In this respect, the ITU-T Q.174 recommendation states that an SCCP entity is responsible for the reduction of the traffic toward a congested node by discarding a portion of the concerned traffic to be sent toward the congested node. The following parameters are used in this traffic limitation mechanism: a) the Importance Value ("IV"), b) the Restriction Level ("RL"), c) the Restriction Sublevel per RL ("RSL"), and the SCCP Congestion Level.

The IV parameter is selected by the SCCP application or by the SCCP itself in some cases (e.g., the message is originated in SCCP). As a guideline, those messages that contribute to increase the signalling traffic afterwards (e.g., CR message) shall be given less importance, that is, less priority than those messages which announce the end of a connection or transaction (e.g., the CO message RLSD). The interested reader is directed to the ITU-T Q.714 recommendation, where there are importance guidance values for the different SCCP message types (see Table 2/Q.714—Default and maximum importance value).

The RL parameter is maintained by SCCP and it is associated with the congestion level of a remote SCCP node. The RL parameter is due to the receipt of a primitive from the underlying protocol stack layers indicating congestion in the given affected SP. Provided that the underlying protocol stack layers correspond to MTP, the primitive is an MTP-STATUS_indication, otherwise the primitive is another primitive of the underlying protocol stack layers adequate to indicate congestion in a given affected signalling node.

The RSL parameter is also maintained by SCCP and it is associated with the congestion level of a remote SCCP node as well. The RSL parameter is due to the receipt of a primitive from the underlying protocol stack layers indicating congestion in the given affected SP, and the RSL applies per specific value of the aforementioned RL parameter. Provided that the underlying protocol stack layers correspond to MTP, the primitive is an MTP-STATUS_indication, otherwise the primitive is another primitive of the underlying protocol stack layers adequate to indicate congestion in a given affected signalling node.

The SCCP Congestion Level is another parameter maintained by SCCP and it is also associated with the congestion level of a remote SCCP node. The Congestion Level parameter is received in an "SCCP/Subsystem Congestion" management message for each affected SCCP. This parameter conveys the nodal or SCCP congestion of a signalling node which calculation depends on the specific implementation.

Therefore, each SCCP node maintains the congestion level of each adjacent node with the variables above. Whenever a message, either relayed from another node or locally originated, has to be sent toward its destination, SCCP performs the traffic limitation on the outgoing traffic by a comparison of the Importance Value of the message and the associated congestion level (RL and RSL variables).

In this respect, if the importance of the message (IV) is greater that the restriction level of the remote SCCP node (RL), then the message is sent and a primitive MTP-TRANSFER_request, or another adequate primitive provided that the underlying protocol stack layers are other than the MTP, is invoked. But if the importance of the message (IV) is lower than the restriction level of the remote SCCP node (RL), then the message is discarded. If the importance of the message (IV) is equal to the restriction level of the remote SCCP node (RL), then the message is discarded proportionately as determined by the restriction sublevel value (RSL). The proportion of traffic reduction is considered to be network specific and an object of administration.

All messages and primitives related to the SCCP Management function consider the SCCP (SSN=1) as a whole and the SCCP users or applications (SSN value other than 1) as users of the SCCP without other distinction. However, SCCP offers two different protocol services: Connection-Oriented and Connectionless services. In this respect, most of the currently existing mechanisms to control network congestion regarding SS7 resources do not differentiate both services, aligned with the current ITU-T recommendations.

For instance, U.S. Pat. No. 6,038,218 to Otsuka et al. teaches a method for controlling congestion on signalling links and an apparatus for controlling traffic congestion on signalling links. To this end, a plurality of signal processors is provided to accommodate shares of signalling links. Then, a congestion condition level is determined by comparing overload conditions and number of processed signals with respective threshold values. Signalling links are given certain priority, and when this priority is lower than the one corresponding to the one for the congestion condition level, such a signalling link is inhibited for use and a new signalling link from another signal processor substitutes the inhibited signalling link. Additional features are provided to clear or raise the congestion condition level.

It can be seen from this patent that there are important needs to control congestion on signalling links on which both connectionless and connection-oriented signalling traffic are involved without distinction. Provided that signalling links become congested, neither connectionless nor connection-oriented traffic can offer acceptable performance.

Nevertheless, there are quite a few other reasons apart from links that may make an SS7 Node reach a risky availability level. For example, certain SCCP applications, generally referred to as SSNs, may become unavailable due to different reasons, and thus these are reported to adjacent SS7 Nodes by SCCP Management messages.

The fact that certain SSNs become unavailable does not necessarily mean that other SSNs in the same SS7 Node are affected. However, it may occur that the SS7 Node itself, namely the corresponding Signalling Point (SP), becomes unavailable as well. This situation implies that all the SSNs in such a node will become unavailable as well, irrespective of their previous particular availability status.

In this respect, U.S. Pat. No. 5,268,895 to Topper describes an SS7 Network with Signalling Points (SP) interconnected, each of them comprising controllers of remote Signalling Points (SP) and remote Subsystems (SSN) related Management information. The patent proposes a Composite status information handled by these controllers and further used for routing of signalling traffic. The composite status further comprises the state of remote subsystems and remote signalling points in terms of individual availability status and congestion level. The patent teaches a method to handle the composite status and to use it for routing. Nevertheless, there is no approach, description, or embodiment of these method and means for to show a distinction on composite status on a per SCCP service, namely connection-oriented or connectionless service.

In the past, and nowadays to some extent, there were not many SS7 applications making use simultaneously of both Connection-oriented and Connectionless services. Just very few instances like the mobile network entity Mobile Switching Center, either alone or collocated with a Visitor Location Register (for the purposes of this application, an "MSC/VLR"), make use of both of them. As a consequence, all the SCCP Management messages could just refer to SCCP, or to SCCP applications, as a whole without distinction on whether the availability, or the congestion, or unavailability was due to Connection-Oriented or Connectionless resources. Most of the network nodes either made use of Connection-Oriented service or made use of the connectionless services. Thus, when an SCCP Management message was received indicating availability (SSA message), or unavailability (SSP message), or congestion (SSC message with indicated congestion level) from another SCCP layer in another node, the SCCP Management message simply meant that the affected SSN or SP was available, or unavailable, or congested for the SCCP service that both network nodes were sharing, irrespective of whether the services were Connection-Oriented or Connectionless.

Under this assumption, U.S. Pat. No. 5,541,987 to Topper et al. proposed a connection-oriented controller for controlling the resource availability of connections already established. More specifically, the connections are blocked when the resource availability is lower than the start-of-blocking threshold, and unblocked when the resource availability is higher than the end-of-blocking threshold. This patent further describes a method of controlling the congestion on already established connections by making use of this controller.

This patent, however, does not mention how the connection-oriented service can be distinguished from the connectionless service, or in other words, how can an SS7 network node know whether a congestion level received relates to the connection-oriented service rather than connectionless, vice versa, or both. In this respect, the only possible assessment is related to local nodal congestion, since one SS7 Node under reference might notice its own local availability, or unavailability, or congestion. However, even this local status can hardly be known unless SS7 Management primitives so indicate between layers, which is far from the explanation in this patent or in the ITU-T recommendations Q.711–Q.714.

In accordance with the ITU-T recommendations, any local application of an SCCP of reference subscribes itself to SCCP connectionless or SCCP connection-oriented services. Either SCCP service, even both of them, can be subscribed by certain SCCP applications or SCCP users represented by the corresponding SSN. Whenever any of these SSNs changes its availability status, it issues an N-STATE primitive toward SCCP which in turn prepares and sends the corresponding SSA message for an available SSN, or the corresponding SSP message for an unavailable SSN, toward adjacent SPs with an SCCP signalling relationship. Nevertheless, these management messages, as stated by ITU-T specifications, apply only on a per SCCP basis rather than applying on a per differentiated protocol service basis, namely per connectionless or per connection-oriented service.

Even though any SCCP user may subscribe to both protocol services, connectionless and connection-oriented, and be identified by a unique Subsystem number (SSN), the resources, features, and controls used under both services are not necessarily the same. In fact, they are more commonly different and separate from each other.

Moreover, the congestion control mechanisms, as stated by ITU-T and generally spread worldwide, do not differentiate connectionless or connection-oriented availability or congestion levels. Thus, a simple lack of resources for one of these two services will necessarily affect the other service since there is no broadcast mechanism or procedure to inform other adjacent nodes about the actually affected resources, but just to indicate SCCP congestion with the worst congestion level detected.

Under these assumptions, any change of availability status affecting just one of these two protocol services will certainly affect both of them since there is no possibility yet to separate such management procedures for connectionless and connection-oriented services.

In this respect, distinguishing the management procedures for connectionless and for connection-oriented services, for users as well as for the protocol services themselves, is an important object of this application.

Another object of this application is to maintain this distinction between management procedures for connectionless and for connection-oriented services in a signalling node of reference even though all signalling nodes adjacent to the node of reference are not able to make such a distinction.

SUMMARY

To accomplish these and other objects, this application generally proposes a network signalling system, comprising a plurality of interconnected signalling points, each of which comprises a protocol layer that is able to simultaneously offer connectionless and connection-oriented protocol services and that is adapted to handle network management procedures. The network management procedures are identified and applied in the network signalling system on a per connectionless and per connection-oriented basis. More specifically, the protocol layer able to simultaneously offer connectionless and connection-oriented protocol services and to distinguish the management procedures on a per connectionless and per connection-oriented basis is a Signalling Connection Control Part layer.

The management procedures in such a network signalling system include procedures to indicate and handle the availability status for the connectionless service itself as well as for users of the connectionless service; the availability status for the connection-oriented service itself as well as for users of the connection-oriented service; and the availability status for both connectionless and connection-oriented services as well as for users of both protocol services. The availability status includes at least one of the possible states "Allowed" or available, "Prohibited" or unavailable, and "Congested" with a given congestion level, for at least one of the possible protocol services, connectionless and connection-oriented. For instance, an SCCP user of both protocol services could simultaneously be in a state "Prohibited" for the connectionless protocol service and a state "Allowed", though with a certain Congestion Level, for the connection-oriented protocol service.

Moreover, the availability status is communicated from a protocol layer at a certain signalling point to a peer protocol layer at another signalling point in the network by corresponding management signalling messages that include information about the affected signalling point, the affected subsystem number, and the affected protocol service, the latter representing at least one of the possible protocol services, connectionless and connection-oriented service. Instances of such management messages that include the affected protocol service, in accordance with this application, may be a "Subsystem Status Allowed" ("SSA") message, a "Subsystem Status Prohibited" ("SSP") message, a "SCCP/Subsystem Congestion" ("SSC") message, a "Subsystem Status Test" ("SST") message, a "Subsystem Out_of_Service Request" ("SOR") message, and a "Subsystem Out_of_Service Grant" ("SOG") message.

The aforementioned availability status is also communicated from a protocol layer at a certain signalling point to users of the protocol layer at the signalling point, and vice versa, by corresponding management signalling primitives that include information about the affected signalling point, the affected subsystem number, and the affected protocol service, the latter representing at least one of the possible protocol services, connectionless and connection-oriented service. Instances of such management primitives that include the affected protocol service, in accordance with this application, may be an N-STATE_request primitive, an N-STATE-indication primitive, an N-PCSTATE_indication primitive, an N-COORD_request primitive, an N-COORD_indication primitive, an N-COORD_response primitive, and an N-COORD_ confirmation primitive.

Furthermore, this application describes how the network signalling system applies signalling traffic restrictions for outgoing traffic, either originated by local users or relayed from other signalling nodes, due to congestion or changes in availability status on adjacent signalling nodes on a per protocol service basis, which is to say, on a per connectionless or per connection-oriented basis. And even further, this application describes how the network signalling system applies signalling traffic restrictions for incoming traffic from adjacent signalling nodes due to congestion or changes in availability status on the signalling node on a per protocol service basis, which is to say, on a per connectionless or per connection-oriented basis.

Besides a network signalling system, this application also describes a method intended to apply network management procedures in a signalling network that includes a plurality of interconnected signalling points, each of the signalling points comprising a protocol layer that is able to simultaneously offer connectionless and connection-oriented protocol services and that is adapted to handle network management procedures identified and applied on a per connectionless and per connection-oriented basis. The method includes routines for determining change of availability status for at least one of the connectionless or the connection-oriented protocol services on users or on the protocol service itself, and routines for updating a corresponding availability status table, for local or remote users and for at least one of the applicable connectionless or connection-oriented protocol service, as well as for the service itself. The method further includes routines for informing the peer protocol layers at the remote signalling points in the network about changes of availability status, on local or remote users and for at least one of the applicable connectionless or connection-oriented protocol service, as well as on the protocol service itself, and routines for querying the peer protocol layers at the remote signalling points in the network about present values of availability status on their own users for at least one of the applicable connectionless or connection-oriented protocol service, as well as for the protocol service itself. The method further includes routines for coordinating a backup user at a remote signalling node to handle signalling traffic initially intended for an indicated affected Subsystem at an indicated Signalling Point and for an indicated protocol service, and routines for applying signalling traffic restrictions for outgoing traffic, either originated by local users or relayed from other signalling nodes, due to congestion or changes in availability status on adjacent signalling nodes on a per protocol service basis. The method further includes routines for applying signalling traffic restrictions for incoming traffic from adjacent signalling nodes due to congestion or changes in availability status on the signalling node on a per protocol service basis.

More specifically, the protocol layer carrying out the method, able to simultaneously offer connectionless and connection-oriented protocol services and able to distinguish management procedures on a per connectionless and per connection-oriented basis, is a Signalling Connection Control Part layer. In the Signalling Connection Control Part layer, peer protocol layers at remote signalling points are informed about changes of availability status by corresponding SCCP management messages like SSA, or SSP, or SSC. Peer protocol layers at remote signalling points are queried about current availability status by corresponding SCCP management messages like SST. These SCCP management messages include an identifier of the affected protocol service, i.e., connectionless or connection-oriented or both, for which there is a particular applicable availability status. Moreover, the entire process to coordinate a replicate or redundant SCCP user for at least one of the possible protocol services, connectionless or connection-oriented, is described.

In addition to network signalling systems and methods, this application also describes an apparatus intended to apply network management procedures in a signalling network that includes a plurality of interconnected signalling points, each of the signalling points comprising a protocol layer that is able to simultaneously offer connectionless and connection-oriented protocol services and that is adapted to handle network management procedures. The network management procedures are supported on a per connectionless and per connection-oriented basis.

The apparatus includes a device that determines a change of availability status for at least one of the connectionless or the connection-oriented services; a memory that stores a corresponding availability status, including congestion measurements, for at least one of the applicable connectionless or connection-oriented services; and a device that informs the peer protocol layers at the remote signalling points in the network about changes in availability status or congestion measurements for at least one of the applicable connectionless or connection-oriented service. The apparatus further includes a device that queries the peer protocol layers at the remote signalling points in the network about present values of availability status or congestion measurements for at least one of the applicable connectionless or connection-oriented service; a device that co-ordinates a backup user at a remote signalling node to handle signalling traffic initially intended for the indicated affected Subsystem at the indicated Signalling Point and for the indicated protocol service representing at least one of the possible protocol services, namely, connectionless or connection-oriented; and a device that applies signalling traffic restrictions for outgoing traffic, either originated by local users or relayed from other signalling nodes, due to congestion or changes in availability status on adjacent signalling nodes on a per protocol service basis, namely, a per connectionless or per connection-oriented basis. The apparatus also includes a device that applies signalling traffic restrictions for incoming traffic from adjacent signalling nodes due to congestion or changes in availability status on the signalling node on a per protocol service basis, namely, a per connectionless or per connection-oriented basis.

More specifically, the protocol layer in the apparatus includes a device to simultaneously offer connectionless and connection-oriented services. Management procedures are distinguished on a per connectionless and per connection-oriented basis by a Signalling Connection Control Part layer.

BRIEF DESCRIPTION OF THE DRAWINGS

The features, objects, and advantages of the invention will become apparent by reading this description in conjunction with the accompanying drawings, in which:

FIG. 1 is a block diagram showing an SCCP protocol layer distinguishing management procedures for connectionless and for connection-oriented services and interfaces toward SCCP users and toward underlying protocol stack layers;

FIG. 2 is a flow diagram representing actions performed at an SCCP node receiving management messages indicating a change of availability status for at least one possible protocol service from a remote SCCP node;

FIG. 3 is a flow diagram representing actions performed at an SCCP node of reference receiving management messages indicating acceptance of a Coordination procedure to support connectionless or connection-oriented signalling traffic initially intended for the node of reference;

FIG. 4 is a flow diagram representing actions performed at an SCCP node receiving management primitives from local users wanting to change their availability status for at least one possible protocol service;

FIG. 5 is a flow diagram representing actions performed at an SCCP node detecting its own nodal SCCP congestion for at least one possible protocol service;

FIG. 6 is a flow diagram representing actions performed at an SCCP node receiving signalling traffic while the SCCP node is aware of a predetermined congestion level for at least one possible protocol service;

FIG. 7 is a flow diagram representing actions performed at an SCCP node to limit connectionless signalling traffic toward an SCCP node that has reached a predetermined congestion level for at least one possible protocol service; and FIG. 8(a) and FIG. 8(b) present alternative network management messages that include an identifier of an affected protocol service.

DETAILED DESCRIPTION

The following describes currently preferred embodiments of network signalling systems and methods that distinguish network management procedures on per connectionless and per connection-oriented bases.

Specifically, the network management procedures at SCCP level imply local signalling in terms of Management Primitives, and remote signalling between different network nodes in terms of Management Messages. The aforementioned management primitives are exchanged between different protocol stack layers in a network node under reference, whereas the management messages are exchanged between peer protocol layers at different nodes in the network.

The network management procedures, generally speaking, imply management messages and primitives, so that achieving the objects and advantages of this invention implies that the primitives and messages comprise information enough to distinguish the SCCP service that the primitive or message applies to. Therefore, the following describes inclusion of an identifier of the affected protocol service, e.g., connectionless or connection-oriented, in all the required management primitives and management messages. Typically, the management messages, which include "Subsystem Status Prohibited" ("SSP"), "Subsystem Status Allowed" ("SSA"), the "SCCP/Subsystem Congestion" ("SSC"), "Subsystem Status Test" ("SST"), "Subsystem Out of Service Request" ("SOR"), and "Subsystem Out of Service Granted" ("SOG"), all comprise, in accordance with the present invention, the identifier to indicate at least one of the possible protocol services, e.g., connectionless and connection-oriented, that they apply to. Also in accordance with the present invention, the management primitives, which include N-STATE, N-PCSTATE, and N-COORD, comprise the identifier to indicate at least one of the possible protocol services that they apply to.

The current structure of protocol parameters presents several alternatives to accomplish the inclusion of the identifier. A first alternative, based on the assumption that all the aforementioned management messages include the identifier, is that spare bits within the octet containing the "Subsystem Multiplicity Indicator" ("SMI") field can be used as shown in FIG. 8(a).

In this respect, depending on different network scenarios and network topologies, not all the aforementioned management messages are required to include the identifier at the same system version. Moreover, different network operators might have different and specific network management problems to solve that might justify successive upgrades, or optional handling of individual management procedures. Under this and other assumptions, and depending on particular scenarios and topologies, another alternative can be provided in accordance with the present invention, by virtue of which the SSC management message can include the identifier in spare bits within the octet containing the congestion level parameter field as FIG. 8(b) shows.

Independently of including the identifier of the affected protocol service in the generally valid form shown in FIG. 8(a), or in a combined alternative of both forms shown by FIG. 8(a) and FIG. 8(b), or in any other form making use of a spare or a new parameter field, the identifier of the affected protocol service, to be included in any management message and any management primitive, can be expressed according to the following table:

Affected SCCP Service
Both Protocol Services (e.g., Connectionless and Connection-oriented) are affected
Connectionless Service affected
Connection-Oriented Service affected
Not used/Not applicable yet This exemplary coding list of possible values can be modified without substantially affecting the scope of the present invention, as anyone skilled in the art may easily understand. However, it is highly advantageous to use a network backward compatible value like "00" to represent the applicability for "Both Protocol Services". In this respect, another aspect of the present invention provides locally invoking the management procedures on a per connectionless and per connection-oriented messages even though a remote node is not able to differentiate them.

A first aspect of a currently preferred embodiment refers to the local users related management procedures, and the routines they make use of. For example, and basically illustrated in FIG. 1, when a connectionless user [N-101], or when a connection-oriented user [N-102], or when a user of both connectionless and connection-oriented protocol services [N-103, N-104] need to become unavailable for traffic purposes, the user issues an N-STATE_request [S-101, S-102, S-103, S-104].

The N-STATE_request is sent with reason set to "Subsystem Out_Of_Service", with the identifier of the protocol service for which the user becomes unavailable (CL, CO, or both), and with its own SSN value. The relevant user information is passed [S-100] to the (CL & CO) users subscription means [T-100] wherein it is checked whether the indicated SSN is subscribed to the protocol service. Then, the local SSN is marked unavailable or prohibited for the affected protocol service represented by the given identifier. Moreover, all other relevant users (local SSNs) of the affected protocol service are informed about such unavailability. For instance, a CL user like N-101 wants to become unavailable and issues the corresponding N-STATE_request [S-101, S-100], its local status is updated for CL protocol service, and the CL & CO users [N-103, N-104] are informed about this change of availability status [S-100, S-103, S-104]. That is, other relevant local users are informed with an N-STATE_indication primitive including the affected local SSN, and the affected protocol service. At this point, it has to be outlined that if a CL user like N-104, which is CL & CO user, become unavailable for CL service and N-103 is thus informed, they still can communicate with each other via CO protocol service, which is not possible at all in the aforementioned prior art systems. Once all the relevant local users for the affected protocol service have been informed, the connectionless status table [T-101], or the connection-oriented status table [T-102], or both are searched [S-105, S-106] to fetch the remote SPs [T-121, T-122] that have to be informed about the local SSN unavailability as well. The relevant data for available destinations and for the affected protocol services are collected [S-107, S-108] at the Management Message Controller [N-105]. The Management Message Controller likely in cooperation [S-110] with the Routing and Discrimination Controller [N-106] sends [S-116, S-109] Subsystem Status Prohibited (SSP) to the remote SPs for the affected protocol service via the Underlying Protocol Stack Layers [N-109].

Notice that similar processes and means as those aforementioned are perfectly valid as well for users wanting to become available for at least one of the possible protocol services, connectionless and connection-oriented. A user wanting to become available issues an N-STATE_request primitive with reason set to "Subsystem In_Service" and including its own SSN and the affected protocol service. Then, the local SSN status is updated to Allowed, all other local users of the affected protocol service are informed with an N-STATE_indication primitive, and the remote SPs are informed with a "Subsystem Status Allowed" (SSA) management message also including the affected protocol service. Moreover, both procedures for local SSNs becoming Allowed, or Prohibited, for at least one of the possible protocol services, and thus informing the remote relevant ends, are also presented in FIG. 4 from a flow chart perspective.

These SSP or SSA management messages are received at the destination SCCP in a remote node where appropriate actions are taken as illustrated in FIG. 2 with references also to entities in FIG. 1. At reception of an SSP or SSA at a certain signalling node [S-109, S-115, S-110], the SCCP Management Messages Controller [N-105] likely in cooperation [S-110] with the SCCP Routing and Discrimination Controller [N-106] checks [S-107, S-108] whether the affected SP in the message is known in the receiver node [T-121, T-122]. Then, the affected SSN included in the SSA or SSP is checked [S-107, S-108] to determine whether the SSN represents a user of the affected protocol service [T-111, T-112] in the affected SP. Once these checks have been successfully performed, the affected SSN is updated in accordance to the received SSA or SSP management message, namely allowed or prohibited, and for the affected protocol service. Then, all local users of the affected protocol service [T-100] are informed with an N-STATE_indication primitive about the change of availability status of the affected SSN in the affected remote SP for the affected protocol service. Moreover, the SCCP Management Messages Controller [N-105], likely in co-operation [S-110] with the SCCP Routing and Discrimination Controller [N-106], initiates a broadcast of the received SSA or SSP toward other remote nodes concerned about the availability status for the affected SSN at the affected SP, and for the affected protocol service.

A second aspect of this preferred embodiment refers to the SCCP service related management procedures, and more specifically to the SCCP and the Nodal Congestion mechanisms and the routines they make use of. A key action is that the Congestion Level, reached in a certain SCCP reference node [N-100], should be independently measured for connectionless and for connection-oriented services. Each of these possible Congestion Level values is reported in a "SCCP/Subsystem Congestion" (SSC) indicating the "Affected protocol service" as at least one of the possible protocol services connectionless or connection-oriented services. For example and as illustrated in FIG. 1 and FIG. 5, the Own SCCP-CL Congestion Controller [N-107], and the Own SCCP-CO Congestion Controller [N-108] are respectively measuring the particular congestion levels reached for connectionless and for connection-oriented protocol services. The Own SCCP-CL Congestion Controller [N-107] and the Own SCCP-CO Congestion Controller [N-108] respectively maintain the current value of the congestion level for connectionless and for connection-oriented, and are also respectively updating [S-111, S-112] the Own Nodal SCCP-CL Congestion Status [T-131] and the Own Nodal SCCP-CO Congestion Status [T-132].

At this point, it has to be mentioned that the congestion control or rather the traffic limitation mechanisms reside in adjacent remote nodes to the one suffering certain congestion conditions. In this respect, FIG. 6 illustrates the flow followed at the reception of signalling traffic in an SCCP node under reference [N-100] which starts suffering certain congestion conditions, whereas FIG. 1 basically presents the functional entities involved. The signalling traffic received [S-109, S-115] in an MTP-TRANSFER message [N-106], provided that the underlying protocol [N-109] is an SS7 MTP layer or in any other primitive appropriate to other underlying protocol than MTP, is filtered on a per connectionless or connection-oriented basis and thus informed [S-110] to the Management Message Controller [N-105]. Then, the corresponding connectionless or connection-oriented related congestion level is respectively checked [S-113, S-114] at the Own SCCP-CL Congestion Controller [N-107] or at the Own SCCP-CO Congestion Controller [N-108]. Next, the corresponding connectionless or connection-oriented related Own Nodal congestion is respectively checked [S-107, S-108] at the Own Nodal SCCP-CL Congestion Controller [T-131] or at the Own Nodal SCCP-CO Congestion Controller [T-132] for the received type of signalling traffic. Provided that certain congestion level has to be reported toward the traffic originating node, the corresponding "SCCP/Subsystem Congestion" (SSC) management message is prepared by the SCCP Management Messages Controller [N-105]. The SSC is sent with "Affected SP" set to our Own SP, "Affected SSN" set to SSN=1 that represents the SCCP, and "Affected Protocol Service" specifying at least one of the possible protocol services, that is, connectionless or connection-oriented that is suffering certain congestion.

In accordance with this aspect, a signalling node receiving an SSC from a remote node with a given Congestion Level for Connection-Oriented service will apply traffic limitations only for Connection-Oriented, and based on pre-defined message priority criteria. Under this assumption, the traffic for connectionless will not suffer any limitation due to the connection-oriented congestion status. This accomplishes an important object of the present invention.

In a similar manner, the reception of an SSC indicating a certain Congestion Level for only Connectionless service will limit the connectionless traffic whereas the connection-oriented traffic in the same node toward the same destination will not experience any limitation due to the SSC for connectionless. For example and as illustrated in FIG. 1 and FIG. 2, at the reception [S-109, S-115, S-110] of an SSC message at a certain signalling node [N-106, N-105] from a known SP, with an affected SSN set to SSN=1 that represents the SCCP, the affected protocol service is checked, e.g., connectionless or connection-oriented or both. Then, the remote SP CL Status [T121], or the remote SP CO Status [T-122], or both, are updated [S-107, S-108] in accordance to the received congestion level for at least one of the possible protocol services.

Eventually, local CL users, or CO users, or CL & CO users, depending on the affected protocol service identifier received in the SSC, are informed with the N-PCSTATE primitive. The N-PCSTATE primitive, as previously described, includes an indicator of the affected protocol service suffering congestion at the indicated remote signalling node. In a situation like that, Local SCCP users for the affected protocol service at this adjacent node will not originate signalling traffic toward the SCCP node reporting congestion for the affected protocol service. However, this adjacent signalling node can still act as a relay node for signalling originated from another remote SCCP node toward the congested SCCP node of reference. This relay signalling traffic, as well as signalling from local users not aware of the destination congestion level, is controlled in the adjacent signalling node wherein traffic limitation or restriction is applied for the affected protocol service.

For example, FIG. 7 shows how connectionless signalling is firstly analysed from a routing perspective, and once a remote destination is encountered, the Importance Value (IV) of the message is checked versus the Restriction Level (RL) for the affected protocol service at the remote destination. Those messages with higher IV than RL are transferred to underlying protocol layers for transmission whereas messages with lower IV than RL are discarded or returned back to the originating user. For those messages with an IV equal than RL a further check of the Restriction Sub-Level (RSL) for the affected protocol service is needed to determine whether the connectionless message has to be transferred or discarded.

Apart from the SSP and SSA management messages that any SCCP user may originate by changing its availability status with an N-STATE primitive, the SCCP can also originate and send an SSA management message under certain conditions. For example, after having recovered from a faulty situation, the SCCP has to alert the remote SPs about its new availability to support signalling traffic. However, this availability could be recovered for just one of the possible protocol service, or at least, both protocol services connectionless and connection-oriented do not necessarily recover at the same time since different resources and methods likely apply. The SSA, originated and sent from the SCCP to indicate its availability to the remote SPs, comprises the Own SP as affected SP, the SSN=1 indicating the SCCP itself as affected SSN, and the identifier of the affected protocol service, e.g., connectionless, or connection-oriented, or both.

In this respect, FIG. 2 and FIG. 1 also show the actions to be performed at the reception [S-109, S-115, S-110] of an SSA message at a certain signalling node [N-106, N-105] from a known SP, with an affected SSN set to SSN=1 that represents the SCCP, and with the identifier of the affected protocol service. Once these initial values are checked, the remote SP CL Status [T-121], or the remote SP CO Status [T-122], or both, are updated [S-107, S-108] in accordance with the received affected protocol service, connectionless or connection-oriented or both. Eventually, local CL users, or CO users, or CL & CO users, depending on the affected protocol service identifier received in the SSA, are informed with the N-PCSTATE primitive. The N-PCSTATE primitive, as previously described, includes an indicator of the affected protocol service becoming available at the indicated remote signalling node.

In addition to these SSP, SSA, and SSC management messages and corresponding procedures, the Subsystem Status Test ("SST") management message and procedure is intended to audit the status of the possible protocol services or the status of any user of the possible protocol services. In particular, the SST is useful to audit the status of a remote SSN marked as Prohibited for at least one of the possible protocol services. To this end, the SST comprise an identifier of the affected protocol service, namely connectionless or connection-oriented or both.

Another aspect of the present invention refers to the "Co-ordinated State Change" management procedure. This procedure may be invoked by any SCCP user at an SP of reference wanting to become out of service, while another replicated SCCP user at another signalling node receives and handles the signalling traffic initially intended for the SCCP user at an SP of reference. In accordance with the present invention, this management procedure is also carried out on a per affected protocol service inasmuch as the procedure related management primitives and management messages include an identifier of the affected protocol service it applies to.

To this end, an SCCP user in our reference node wanting that its signalling traffic being received and handled by another replicate SCCP user at a remote node, the SCCP user in our reference node issues an N-COORD_request primitive. The N-COORD_request primitive comprising an identifier of the affected protocol service for which the SCCP user in our reference node wants another replicate SCCP user at a remote node to act as a backup user for signalling traffic handling purpose. This management primitive is mapped by SCCP to the corresponding management message "Subsystem Out of service Request" ("SOR") to be sent toward the replicated SCCP user at a remote SP as an explicit invitation to accept acting as a backup node.

The SOR management message includes the affected protocol service identifier in accordance with SCCP user settings in the originating management primitive. When this SOR management message is received at the remote node where the replicate SCCP user is located, checks are made to determine whether there are available resources to handle the expected signalling traffic for the affected protocol service, and provided that there are, the replicate SCCP user is queried with the management primitive N-COORD_indication. The N-COORD_indication primitive including an identifier of the affected protocol service in accordance with the one received in the SOR management message. Provided that the replicate SCCP user (backup subsystem) has enough available resources and accepts handling signalling traffic from the requester SCCP user, the replicate SCCP user issues an N-COORD_response management primitive comprising an identifier of the affected protocol service in accordance with the one received in the corresponding indication. This management primitive is mapped by SCCP to the corresponding management message "Subsystem Out of service Grant" ("SOG") to be sent toward the backup requester SCCP user at the reference node as an explicit acceptance of acting as a backup node.

The SOG management message includes the affected protocol service identifier in accordance with SCCP user settings in the originating management primitive. When this SOG management message is received at the reference node where the requester local SCCP user is located, and as illustrated in FIG. 3, the local SSN representing the local SCCP user is marked unavailable or prohibited for the affected protocol service represented by the given identifier. Next, the local SCCP user is informed about backup acceptance from the replicate SCCP user with the management primitive N-COORD_confirmation which includes an identifier of the affected protocol service. And eventually, the remote SPs are informed about the local SCCP user unavailability for the affected protocol service with an SSP management message sent to the remote SPs via the Underlying Protocol Stack Layers. The SSP comprises an identifier of the affected protocol service as in other aforementioned management procedures.

A further aspect of this embodiment is provided to accomplish the additional and aforementioned object of the present invention by virtue of which a signalling node of reference is able to maintain a distinction between management procedures for connectionless as well as for connection-oriented services even though all signalling nodes, adjacent to the node of reference, are not able to make such a distinction, and especially since most of the management procedures require and are based on co-operation from adjacent nodes. In a situation like that, as sending any management message to any adjacent signalling node with a unique affected protocol service, either connectionless or connection-oriented, the adjacent node will not understand that just a unique protocol service is affected, and the adjacent node will simply assume that the SCCP as a whole, or the affected SSN for both protocol services, have got the indicated availability status.

One possible solution to this problem in accordance with the present invention, and thereby considered a further aspect of this preferred embodiment, is described below in a non-restrictive manner and merely for the sake of clarity. This solution implies that a signalling node of reference knows whether each particular adjacent node supports or not the management procedures on a per protocol basis. Under this assumption, changes of availability status for just one of the possible protocol services or, in other words, not for all of them, are not communicated by an appropriate management message toward such adjacent signalling nodes not supporting management messages on a per protocol basis. Instead, expected signalling traffic from the adjacent signalling nodes is received as incoming signalling traffic, and corresponding management procedures are appropriately applied to such incoming traffic at the signalling node of reference.

On reception of an incoming SCCP message from underlying protocol layers, it is determined the protocol service that such a message belongs to and then, the Importance Value (IV) is extracted from the received message, or a default value is used depending on the SCCP message type if an IV had not been received. This value can be the same one as for outgoing traffic, relay or from local users, which according to this preferred embodiment can also be used to perform the traffic limitations for incoming SCCP messages. The extracted Importance Value will be compared to the own congestion level for the affected protocol service, since this was the value broadcast in SSC messages to adjacent SCCP nodes supporting management procedures on a per protocol service basis, and it represents the nodal or SCCP congestion level of the protocol service at the own node.

If the importance of the received message is greater than the own congestion level for the affected protocol service, connectionless or connection-oriented, then the message is further processed in SCCP. If the importance of the message is lower than the own congestion level for the affected protocol service, then the message is discarded or treated in accordance with the affected protocol service technical specifications. If the importance of the message (IV) is equal to the own congestion level for the affected protocol service, then the message shall be proportionally discarded in accordance with Restriction Sub-Level related criteria.

In this respect, the portion of traffic reduction is considered to be network specific and an object of administration. This mechanism, which specifically applies for incoming traffic at the signalling node of reference, could be enhanced by setting a threshold value that would allow to reduce the load taken by the message return or connection refusal process in case of great overload. When the own congestion level for the affected protocol service is greater than the threshold discard level for the affected protocol service, those messages with an Importance Value lower than the threshold discard level for the corresponding protocol service could be directly dropped, while messages with an Importance Value greater than the threshold discard level for the corresponding protocol service, though lower than the own congestion level, could be either returned (CL messages), or refused (Connection Request message in CO protocol service), or discarded (other CO messages than Connection Request). That is, also this Threshold Discard Value is, in accordance to the invention, subject of applicability on a per protocol service basis.

Applicants' invention is described above in connection with various embodiments that are intended to be illustrative, not restrictive. It is expected that those of ordinary skill in this art will modify these embodiments. The scope of Applicants' invention is defined by the following claims, and all modifications that fall within the scopes of these claims are intended to included therein.

What is claimed is:

1. A signaling point in a network signaling system, the network signaling system having a plurality of interconnected signaling points, comprising
   a protocol layer for simultaneously providing connectionless and connection-oriented protocol services, wherein the protocol layer is a Signaling Connection Control Part (SCCP) layer and is adapted to handle network management procedures that are identified, distinguished, and applied in the network signaling system on per connectionless and per connection-oriented bases;
   wherein the network management procedures comprise procedures to indicate and handle availability status for the connectionless service itself and for a user of the connectionless service, availability status for the connection-oriented service itself and for a user of the connection-oriented service, and availability status for both the connectionless and connection-oriented services and for users of both protocol services.

2. The signaling point of claim 1, wherein an availability status comprises at least one of an "Allowed" or available state, a "Prohibited" or unavailable state, and a "Congested" or a predetermined congestion level state, for at least one of the connectionless and connection-oriented services.

3. The signaling point of claim 1, wherein an availability status is communicated from a protocol layer at the signalling point to a peer protocol layer at another signalling point by a corresponding management signalling message that includes information about an affected signalling point, an affected subsystem number, and an affected protocol service.

4. The signaling point of claim 3, wherein a "Subsystem Status Allowed" management message is sent from a protocol layer at a signalling point to a peer protocol layer at another signalling point; the "Subsystem Status Allowed" management message includes an affected protocol service indicator representing at least one protocol service, an affected subsystem number representing either a user of the at least one protocol service or the protocol service itself, and an affected signalling point at which the affected subsystem number resides; and the "Subsystem Status Allowed" message indicates that the affected subsystem number located at the affected signalling point is available to support signalling traffic for the indicated at least one protocol service.

5. The signaling point of claim 3, wherein a "Subsystem Status Prohibited" management message is sent from a pmtocol layer at a signalling point to a peer protocol layer at another signalling point; the "Subsystem Status Prohibited" message includes an affected protocol service indicator representing at least one protocol service, an affected subsystem number representing a user of the at least one protocol service, and an affected signalling point at which the user represented by a subsystem number resides; and the "Subsystem Status Prohibited" message indicates that the affected subsystem number located at the affected signalling point is unavailable to support signalling traffic for the indicated at least one protocol service.

6. The signaling point of claim 3, wherein a "SCCP/Subsystem Congestion" management message is sent from a protocol layer at a signalling point to a peer protocol layer at another signalling point; the "SCCP/Subsystem Congestion" message includes an affected protocol service indicator representing at least one protocol service, an affected subsystem number representing either a user of the at least one protocol service or the protocol service itself, a congestion level that the indicated protocol service or the user has reached, and an affected signalling point at which the affected subsystem number resides; and the "SCCP/Subsystem Congested" message indicates that the affected subsystem number located at the affected signalling point has reached the indicated congestion level for supporting signalling traffic for the indicated at least one protocol service.

7. The signaling point of claim 3, wherein a "Subsystem Status Test" management message is sent from a protocol layer at a signalling point to a peer protocol layer at another signalling point; the "Subsystem Status Test" message includes an affected protocol service indicator representing at least one protocol service, an affected subsystem number representing either a user of the at least one protocol service or the protocol service itself, and an affected signalling point at which the affected subsystem number resides; and the "Subsystem Status Test" message queries about an availability status of the affected subsystem number located at the affected signalling point to support signalling traffic for the indicated at least one protocol service.

8. The signaling point of claim 3, wherein a "Subsystem Out of service Request" (SOR) management message is sent from a protocol layer at a signalling point to a peer protocol layer at another signalling point; the "Subsystem Out of service Request" message includes an affected protocol service indicator representing at least one protocol service, an affected subsystem number representing either a user of the at least one protocol service or the protocol service itself, and an affected signalling point at which the affected subsystem number resides; and the "Subsystem Out of service Request" message requests a backup subsystem to handle signalling traffic for the indicated affected protocol service that was initially addressed to the affected subsystem number located at the affected signalling point.

9. The signaling point of claim 3, wherein a "Subsystem Out of service Granted" (SOG) management message is sent from a protocol layer at a signalling point to a peer protocol layer at another signalling point; the "Subsystem Out of service Granted" message includes an affected protocol service indicator representing at least one protocol service, an affected subsystem number representing either a user of the at least one protocol service or the protocol service itself, and an affected signalling point at which the affected subsystem number resides; and the "Subsystem Out of service Granted" message indicates an acceptance to act as a backup subsystem to handle signalling traffic for the indicated affected protocol service that was initially addressed to the affected subsystem number located at the affected signalling point.

10. The signaling point of claim 1, wherein availability status is communicated from a protocol layer at a signalling point to a user of the protocol layer at the signalling point by a corresponding management signalling primitive that includes information about the affected signalling point, the affected subsystem number, and the affected protocol service representing at least one protocol service.

11. The signaling point of claim 1, wherein availability status is communicated from a user of a protocol layer at a signalling point to the protocol layer at the signalling point by a corresponding management signalling primitive that includes information about the affected signalling point, the affected subsystem number, and the affected at least one protocol service.

12. The signaling point of claim 1, wherein the network management procedures include applying signalling traffic restrictions for outgoing traffic originated by a local user or relayed from another signalling node due to congestion or changes in availability status of an adjacent signalling node on per connectionless and per connection-oriented bases.

13. The signaling point of claim 1, wherein the network management procedures include applying signalling traffic restrictions for incoming traffic from adjacent signalling nodes due to congestion or changes in availability status in a signalling node on per connectionless and per connection-oriented bases.

14. A method of applying network management procedures in a signalling network that includes a plurality of interconnected signalling points, each signalling point having a protocol layer that is able to simultaneously offer connectionless and connection-oriented protocol services and that is adapted to handle network management procedures, the method comprising:
   a) determining a change of availability status for at least one of the protocol services;
   b) updating a corresponding availability status table for the at least one protocol service;
   c) informing a peer protocol layer at a remote signalling point about the change of availability status for the at least one protocol service;
   d) querying the peer protocol layer at the remote signalling point about a present value of availability status for the at least one protocol service;
   e) co-ordinating a backup user at a remote signalling node to handle signalling traffic initially intended for an indicated affected subsystem at the indicated signalling point and for the indicated protocol service representing at least one protocol service;
   f) applying signalling traffic restrictions for outgoing traffic originated by a local user or relayed from another signalling node due to congestion or a change in availability status on an adjacent signalling node on a per protocol service basis; and
   g) applying signalling traffic restrictions for incoming traffic from adjacent signalling nodes due to congestion or a change in availability status on an own signalling node on a per protocol service basis; wherein the network management procedures are identified, distinguished, and applied on per connectionless and per connection-oriented bases.

15. The method of claim 14, wherein the protocol layer is a Signalling Connection Control Part layer.

16. The method of claim 15, wherein step a) includes determining a change of availability status based on at least one of a user of the at least one protocol service and the at least one protocol service itself.

17. The method of claim 15, wherein step b) comprises updating the corresponding availability status table based on at least one of a user of the at least one protocol service and the at least one protocol service itself.

18. The method of claim 16, wherein a user of the at least one protocol service and the at least one protocol service itself can be located at the own signalling node or at a remote signalling node.

19. The method of claim 17, wherein a user of the at least one protocol service and the at least one protocol service itself can be located at the own signalling node or at a remote signalling node.

20. The method of claim 15, wherein step c) comprises informing peer protocol layers at remote signalling points about changes in availability status of at least one of a user of the at least one protocol service and the at least one protocol service itself.

21. The method of claim 20, wherein a protocol layer at a remote signalling point is informed about a change of availability status through a corresponding SCCP management message that includes an identifier of the protocol service for which the change of availability status occurred.

22. The method of claim 15, wherein step d) comprises querying a peer protocol layer at a remote signalling point about a current value of availability status of at least one of its own users of the at least one protocol service and the at least one protocol service itself.

23. The method of claim 15, wherein step e) comprises the steps of: e1) requesting, by a local user, an indicated backup subsystem at a remote signalling node to deal with signalling traffic for an indicated protocol service initially addressed to the local user; e2) informing a peer protocol layer at the remote signalling point about the request for backup for the indicated protocol service; e3) requesting, by the peer protocol layer at the remote signalling point, its indicated user to act as backup of the local subsystem for the indicated protocol service; e4) answering, by the indicated user, with an acceptance to the peer protocol layer for the indicated protocol service; e5) granting, by the peer protocol layer, the backup subsystem to the local protocol layer to handle traffic addressed to the local protocol user for the indicated protocol service; and e6) informing, by the local protocol layer, the local user of the granted backup subsystem to handle signalling traffic addressed to the local user for the indicated protocol service.

24. The method of claim 15, wherein step f) comprises comparing and treating the remote affected congestion level, the remote restriction level, and the remote restriction sub-Level on a per protocol service basis.

25. The method of claim 15, wherein step g) comprises comparing and treating the local congestion level, the local restriction level, and the local restriction sub-Level on a per protocol service basis.

26. An apparatus for applying network management procedures in a signalling network that includes a plurality of interconnected signalling points, each signalling point including a protocol layer that is able to simultaneously offer connectionless and connection-oriented protocol services and that is adapted to handle network management procedures supported on per connectionless and per connection-oriented bases, the apparatus comprising:
   means for determining a change of availability status for at least one of the protocol services;
   a memory in which availability status, including a congestion measurement, for at least one of the protocol services can be stored;
   means for informing a peer protocol layer at a remote signalling point about a change of availability status or a congestion measurement for at least one protocol Service;
   means for querying a peer protocol layer at a remote signalling point about a present value of availability status or congestion measurement for at least one protocol service;

means for co-ordinating a backup user at a remote signalling node to handle signalling traffic initially intended for an indicated affected subsystem at an indicated signalling point and for an indicated protocol;

means for applying a signalling traffic restriction for outgoing traffic originated by a local user or relayed from another signalling node due to congestion or a changes of availability status on an adjacent signalling node on a per protocol service basis; and means for applying a signalling traffic restriction for incoming traffic from an adjacent signalling node due to congestion or a change of availability status on an own signalling node on a per protocol service basis.

27. The apparatus of claim 26, wherein the protocol layer is able to simultaneously offer connectionless and connection-oriented services, and the apparatus further comprises means for distinguishing the management procedures on per connectionless and per connection-oriented bases, the distinguishing means residing at a signalling connection control part layer.

28. A signalling point having means for applying network management procedures in a network signalling system that comprises a plurality of interconnected signalling points, the signalling point comprising a protocol layer that operates in accordance with a Signalling Connection Control Part (SCCP) to simultaneously offer connectionless and connection-oriented protocol services and to handle the network management procedures, wherein the protocol layer includes means to distinguish the network management procedures on per connectionless and connection-oriented basis, the distinction performed by setting a protocol service identifier in connection with an availability status, and the network management procedures comprising procedures to indicate and handle availability status for the connectionless protocol service itself as well as for users of said connectionless protocol service, availability status for the connection-oriented protocol service itself as well as for users of said connection-oriented protocol service, and availability status for both connectionless and connection-oriented protocol services as well as for users of both protocol services.

29. The signalling point of claim 28, wherein the availability status comprises at least one of an "Allowed" or available state, a "Prohibited" or unavailable state, and a "Congested" state with a given congestion level, for at least one of the connectionless and connection-oriented protocol services.

30. The signalling point of claim 28, wherein the protocol layer includes:

means for determining a change of availability status at an affected signalling point for at least one protocol service;

storage in which availability status, including a congestion measurement, can be stored for at least one protocol service; and means for informing a peer protocol layer at a remote signalling point about a change of availability status at the affected signalling point for the at least one protocol service.

31. The signalling point of claim 30, wherein the protocol layer further comprises means for auditing, in co-operation with a peer protocol layer at a remote signalling point, about a present value of an availability status at an affected signalling point for at least one protocol service.

32. The signalling point of claim 30, wherein the means for informing a peer protocol layer at a remote signalling point includes means for sending a "Subsystem Status Allowed" (SSA) management message to said peer protocol layer, the "Subsystem Status Allowed" management message comprising an affected protocol service identifier representing at least one protocol service, an affected subsystem number representing either a user of the at least one protocol service or the protocol service itself, and an affected signalling point at which the affected subsystem number resides; and said "Subsystem Status Allowed" indicating that the affected subsystem number located at the affected signalling point is available to support signalling traffic for the indicated at least one protocol service.

33. The signalling point of claim 30, wherein the means for informing a peer protocol layer at a remote signalling point includes means for sending a "Subsystem Status Prohibited" (SSP) management message to said peer protocol layer, the "Subsystem Status Prohibited" management message comprising an affected protocol service identifier representing at least one protocol service, an affected subsystem number representing a user of the at least one protocol service, and an affected signalling point at which the user represented by the subsystem number resides; and said "Subsystem Status Prohibited" indicating that the affected subsystem number located at the affected signalling point is unavailable to support signalling traffic for the indicated at least one protocol service.

34. The signalling point of claim 30, wherein the means for informing a peer protocol layer at a remote signalling point includes means for sending an "SCCP/Subsystem Congestion" (SSC) management message to said peer protocol layer, the "SCCP/Subsystem Congestion" management message comprising an affected protocol service identifier representing at least one protocol service, an affected subsystem number representing either a user of the at least one protocol service or the protocol service itself, a congestion level that the indicated protocol layer or user has reached, and an affected signalling point at which the user or protocol layer represented by the subsystem number resides; and said "SCCP/Subsystem Congested" indicating that the affected subsystem number located at the affected signalling point reaches the indicated congestion level to support signalling traffic for the indicated at least one protocol service.

35. The signalling point of claim 31, wherein the means for auditing in co-operation with a peer protocol layer at a remote signalling point includes a "Subsystem Status Test" (SST) management message sent to, or received from, said peer protocol layer, the "Subsystem Status Test" management message comprising an affected protocol service identifier representing at least one protocol service, an affected subsystem number representing either a user of said at least one protocol service or the protocol service itself, and an-effected signalling point at which the affected subsystem number resides; and said "Subsystem Status Test" querying about the availability status of the affected subsystem number located at the affected signalling point to support signalling traffic for the indicated at least one protocol service.

36. The signalling point of claim 28, wherein the protocol layer includes means for coordinating a backup user with a peer protocol layer at a remote signalling point to handle signalling traffic initially intended for an indicated affected subsystem at an indicated signalling point, for an indicated protocol service representing at least one protocol service.

37. The signalling point of claim 35, wherein the means for coordinating a backup user with a peer protocol layer at a remote signalling point includes means for exchanging a "Subsystem Out of service Request" (SOR) management message with said peer protocol layer, the SOR comprising an affected protocol service identifier representing at least one protocol service, an affected subsystem number representing a user of the at least one protocol service, and an affected signalling point at which the affected subsystem number resides; and said "Subsystem Out of service Request" requesting a backup subsystem to handle signalling traffic for the indicated affected protocol service, signalling traffic that was initially addressed to the affected subsystem number located at the affected signalling point.

38. The signalling point of claim 37, wherein the means for coordinating a backup user with a peer protocol layer at a remote signalling point includes means for exchanging a "Subsystem Out of service Granted" (SOG) management message with said peer protocol layer, the SOG comprising an affected protocol service identifier representing at least one protocol service, an affected subsystem number representing a user of the at least one protocol service, and an affected signalling point at which the affected subsystem number resides; and said "Subsystem Out of service Granted" indicating an acceptance to act as a backup subsystem to handle signalling traffic for the indicated affected protocol service, signalling traffic that was initially addressed to the affected subsystem number located at the affected signalling point.

39. The signalling point of claim 30, wherein the protocol layer further comprises means for applying signalling traffic restrictions for the traffic in the direction of the affected signalling point due to a change in its availability status on a per protocol service basis.

40. The signalling point of claim 28, wherein the availability status is communicated from the protocol layer to a user of the protocol layer by a corresponding management signalling primitive that comprises information about an affected signalling point, an affected subsystem number, and an affected protocol service identifier representing at least one protocol service.

41. The signalling point of claim 28, wherein the availability status is communicated from a user of the protocol layer to the protocol layer by a corresponding management signalling primitive that comprises information about the affected signalling point, the affected subsystem number, and the affected protocol service identifier representing at least one protocol service.

42. A method of applying network management procedures in a signalling network that includes a plurality of interconnected signalling points, each signalling point having a protocol layer operating in accordance with a Signalling Connection Control Part (SCCP) to simultaneously offer connectionless and connection-oriented protocol services and to handle network management procedures, the method comprising
distinguishing the network management procedures on per connectionless and connection-oriented basis, the distinction performed by
setting a protocol service identifier in connection with an availability status;
determining a change of availability status at an affected signalling point for at least one of the protocol services;
updating a corresponding availability status table for the at least one protocol service; and
informing a peer protocol layer at a remote signalling point about a change of availability status at the affected signalling point for the at least one protocol service.

43. The method of claim 42, wherein the step of determining a change of availability status includes at least one of the following steps:
determining a change in availability status of at least one user of the at least one protocol service; and
determining a change in availability status of the at least one protocol service itself.

44. The method of claim 42, wherein the step of updating a corresponding availability status table includes at least one of the following steps:
updating the corresponding availability status table for at least one user of the at least one protocol service; and
updating the corresponding availability status table for the at least one protocol service itself.

45. The method of claim 42, wherein the step of informing a peer protocol layer about a change of availability status includes at least one of the following steps:
informing a peer protocol layer at a remote signalling point about a change in availability status of at least one user of the at least one protocol service; and
informing a peer protocol layer at a remote signalling point about a change in availability status of the at least one protocol service itself.

46. The method of claim 42, further including a step of auditing, in co-operation with a peer protocol layer at a remote signalling point, about a present value of an availability status at an affected signalling point for at least one protocol service.

47. The method of claim 46, wherein the step of auditing about a present value of an availability status includes at least one of the following steps:
querying a peer protocol layer at a remote signalling point about a current value of availability status for at least one own user of the at least one protocol service; and
querying a peer protocol layer at a remote signalling point about a current value of availability status for the at least one own protocol service itself.

48. The method of claim 42, wherein the step of distinguishing the network management procedures on a per connectionless and connection-oriented basis includes a step of coordinating a backup user with a peer protocol layer at a remote signalling node to handle signalling traffic initially intended for an indicated affected subsystem at an indicated signalling point, for an indicated protocol service identifier representing at least one protocol service.

49. The method of claim 48, wherein the step of coordinating a backup user with a peer protocol layer includes the steps of:
a local user requesting an indicated backup subsystem at a remote signalling node to deal with signalling traffic for an indicated protocol service initially addressed to said local user;
informing a peer protocol layer at the remote signalling point about the request for backup for the indicated protocol service;
the peer protocol layer at the remote signalling point requesting its indicated local subsystem to act as backup of the user for the indicated protocol service;
the local subsystem answering with an acceptance to the peer protocol layer for the indicated protocol service;

the peer protocol layer granting the backup subsystem to the local protocol layer to handle traffic addressed to the local protocol user for the indicated protocol service; and the local protocol layer informing the local user of the granted backup subsystem to handle signalling traffic addressed to the local user for the indicated protocol service.

50. The method of claim 42, further including a step of applying signalling traffic restrictions for outgoing traffic originated by a local user or relayed from another signalling node due to a change in availability status on an adjacent signalling node on a per protocol service basis.

51. The method of claim 50, wherein the step of applying signalling traffic restrictions for outgoing traffic includes a step of comparing and treating a remote affected Congestion Level, a remote Restriction Level, and a remote Restriction Sub-Level on a per protocol service basis.

52. The method of claim 42, further comprising a step of applying signalling traffic restrictions for incoming traffic from an adjacent signalling node due to a change in availability status on an own signalling node on a per protocol service basis.

53. The method of claim 52, wherein the step of applying signalling traffic restrictions for incoming traffic includes a step of comparing and treating a local Congestion Level, a local Restriction Level, and a local Restriction Sub-Level on a per protocol service basis.

* * * * *